(12) United States Patent
Kang et al.

(10) Patent No.: US 11,874,955 B2
(45) Date of Patent: Jan. 16, 2024

(54) ELECTRONIC DEVICE

(71) Applicant: LG INNOTEK CO., LTD., Seoul (KR)

(72) Inventors: Min Seok Kang, Seoul (KR); Ellen Park, Seoul (KR); Eun Yeob Kang, Seoul (KR); Keal Doo Moon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/624,671

(22) PCT Filed: Jul. 3, 2020

(86) PCT No.: PCT/KR2020/008710
§ 371 (c)(1),
(2) Date: Jan. 4, 2022

(87) PCT Pub. No.: WO2021/006552
PCT Pub. Date: Jan. 14, 2021

(65) Prior Publication Data
US 2022/0276695 A1 Sep. 1, 2022

(30) Foreign Application Priority Data
Jul. 5, 2019 (KR) .................. 10-2019-0081184

(51) Int. Cl.
*G06F 3/00* (2006.01)
*G06F 3/01* (2006.01)
*G06F 3/0354* (2013.01)

(52) U.S. Cl.
CPC .............. *G06F 3/005* (2013.01); *G06F 3/017* (2013.01); *G06F 3/03547* (2013.01)

(58) Field of Classification Search
CPC ...... G06F 3/005; G06F 3/017; G06F 3/03547; G06F 3/0304; G06F 3/042; G06F 3/0481; G06F 3/0485; G06F 3/0425; G06F 3/04812
See application file for complete search history.

(56) References Cited

U.S. PATENT DOCUMENTS

| | | | | |
|---|---|---|---|---|
| 5,825,352 A | * | 10/1998 | Bisset | G06F 3/0488 345/157 |
| 6,570,557 B1 | * | 5/2003 | Westerman | G06F 3/04883 400/489 |
| 7,030,861 B1 | * | 4/2006 | Westerman | G06F 3/04883 345/173 |

(Continued)

FOREIGN PATENT DOCUMENTS

| | | |
|---|---|---|
| JP | 6197012 B2 | 9/2017 |
| KR | 10-0941927 B | 2/2010 |

*Primary Examiner* — Grant Sitta
(74) *Attorney, Agent, or Firm* — Birch, Stewart, Kolasch & Birch, LLP

(57) ABSTRACT

One embodiment discloses an electronic device including a first acquisition unit which outputs first motion information about a detection target in a first detection region, a second acquisition unit which outputs second motion information about the detection target in a second detection region, and a control unit which executes an instruction according to the first motion information and the second motion information, wherein the first detection region and the second detection region overlap at least partially.

13 Claims, 15 Drawing Sheets

(56) References Cited

U.S. PATENT DOCUMENTS

| | | | |
|---|---|---|---|
| 2004/0021633 A1* | 2/2004 | Rajkowski | G06F 3/0233 |
| | | | 345/156 |
| 2006/0132435 A1* | 6/2006 | Machida | G06F 3/0317 |
| | | | 345/157 |
| 2010/0328227 A1* | 12/2010 | Matejka | G06F 3/0488 |
| | | | 345/173 |
| 2012/0169671 A1* | 7/2012 | Yasutake | G06F 3/0425 |
| | | | 178/18.09 |
| 2012/0212413 A1 | 8/2012 | Plagemann et al. | |
| 2015/0338947 A1 | 11/2015 | Lee | |
| 2016/0187996 A1 | 6/2016 | Safer | |

* cited by examiner

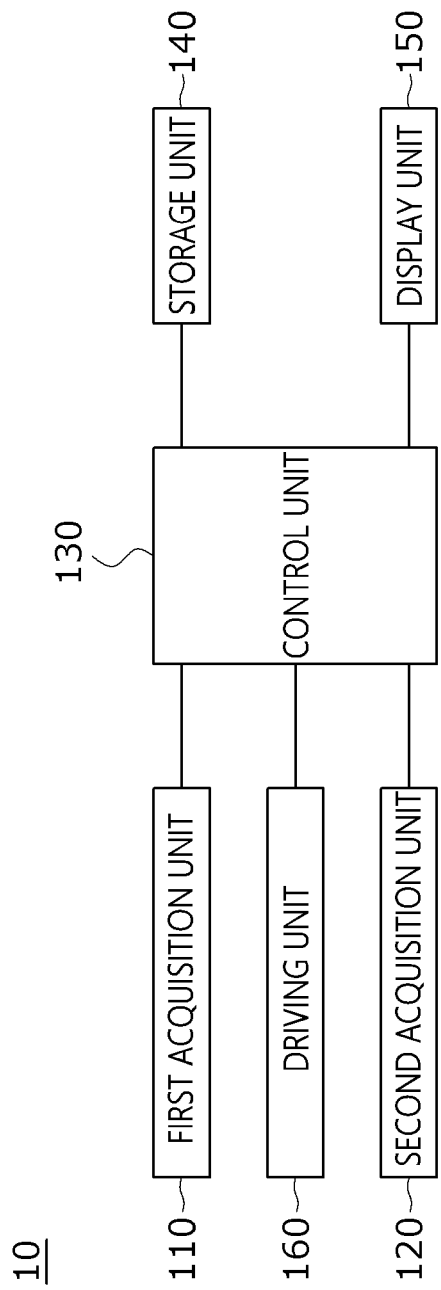
[FIG. 1]

[FIG. 2]
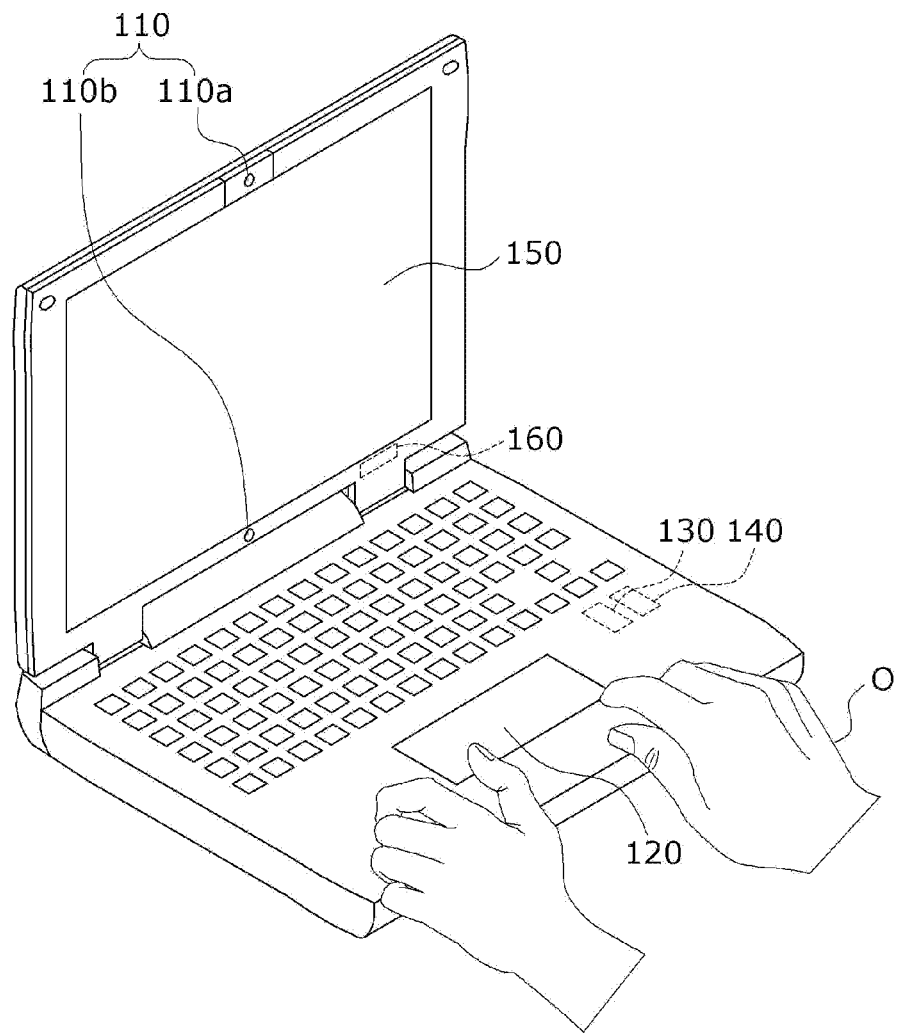

[FIG. 3]
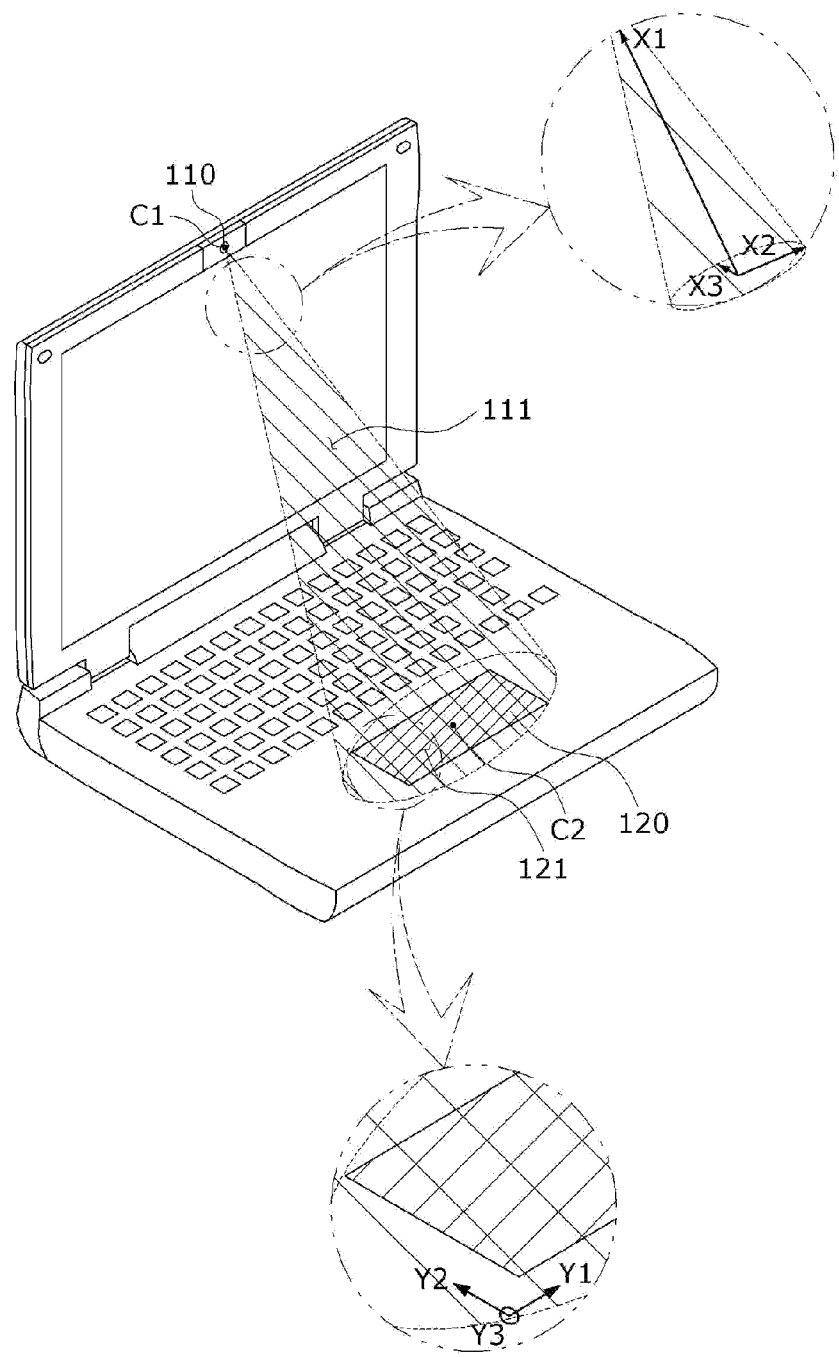

[FIG. 4]
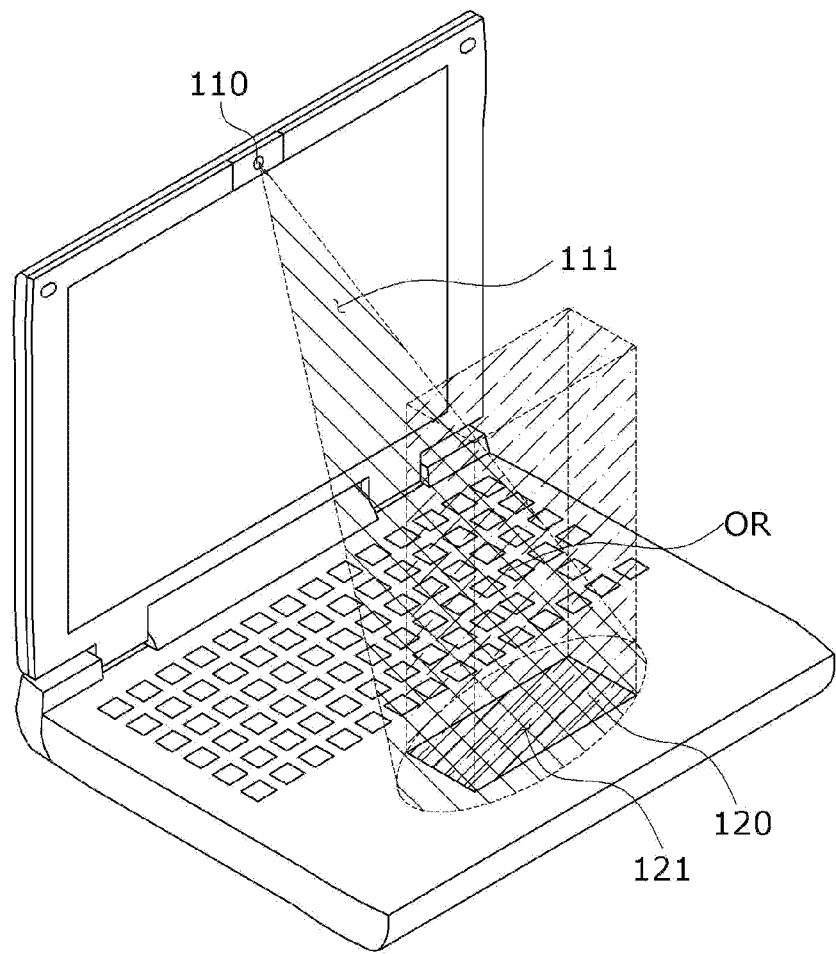

[FIG. 5]
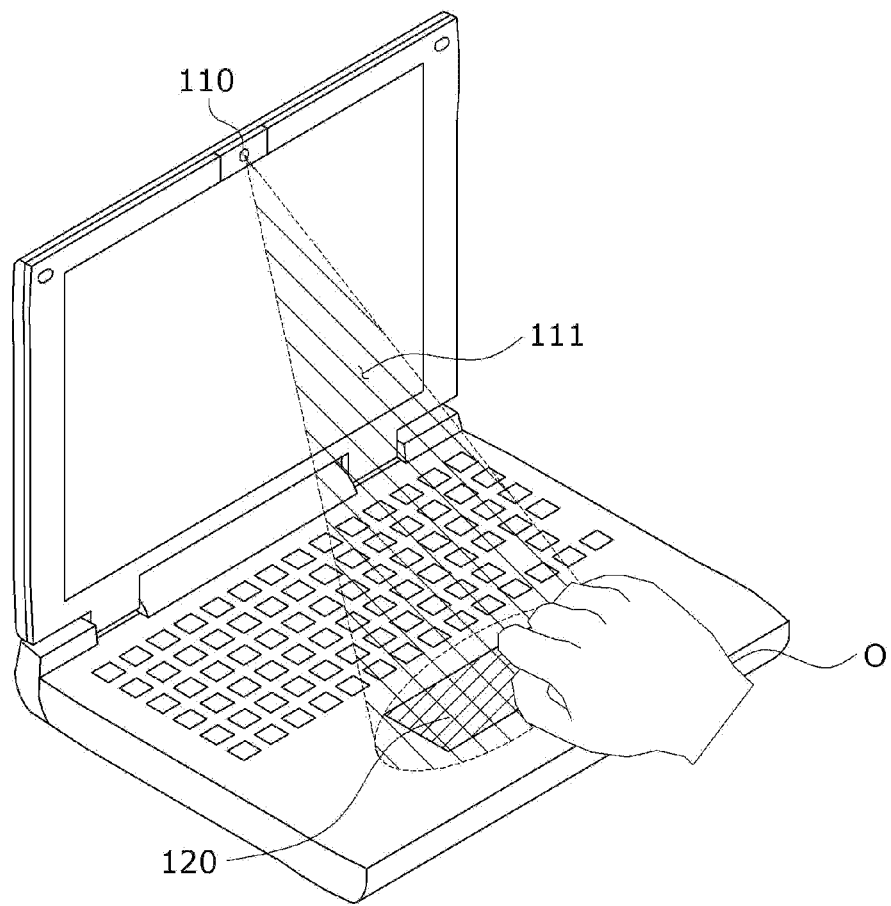

[FIG. 6]
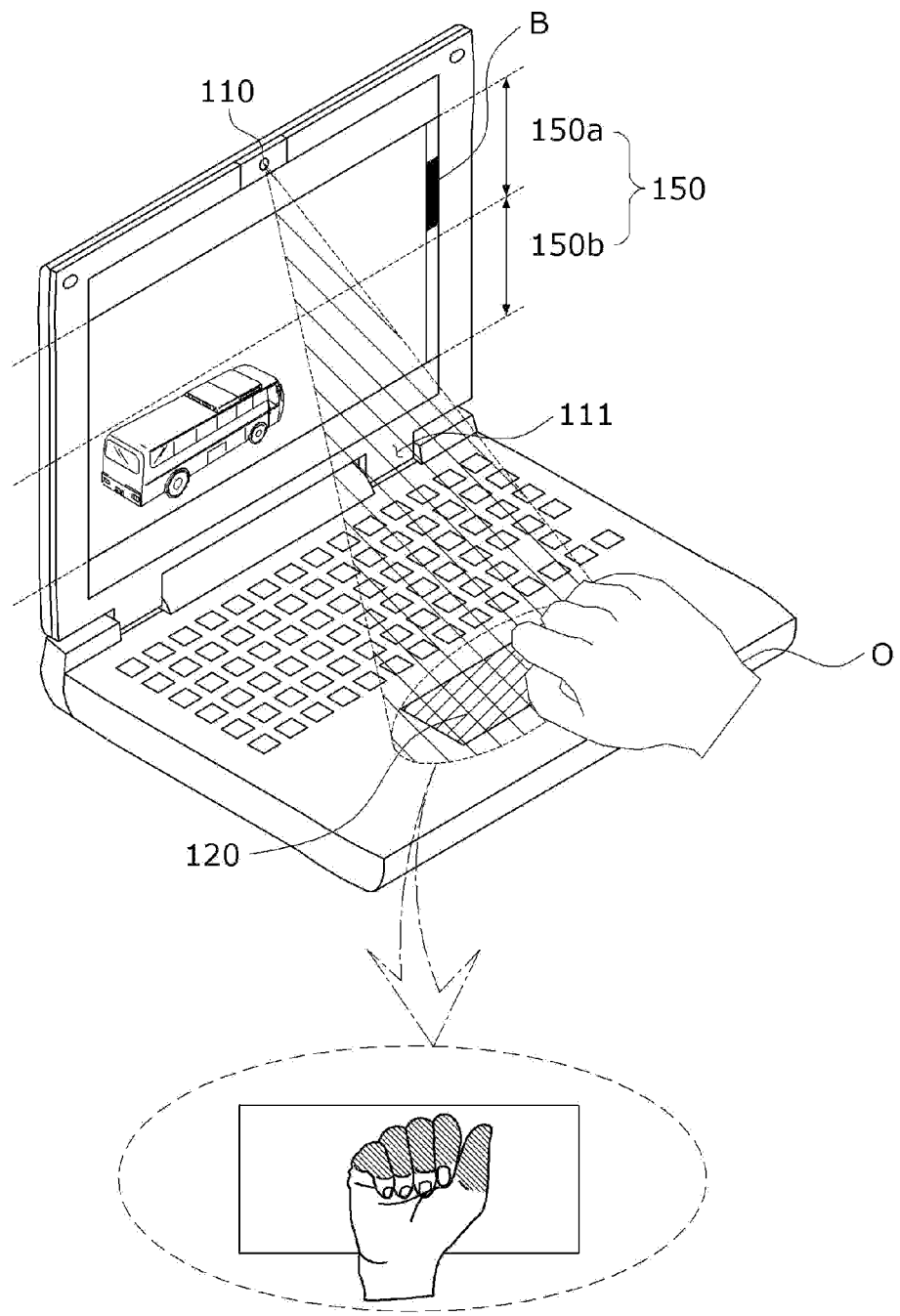

[FIG. 7]
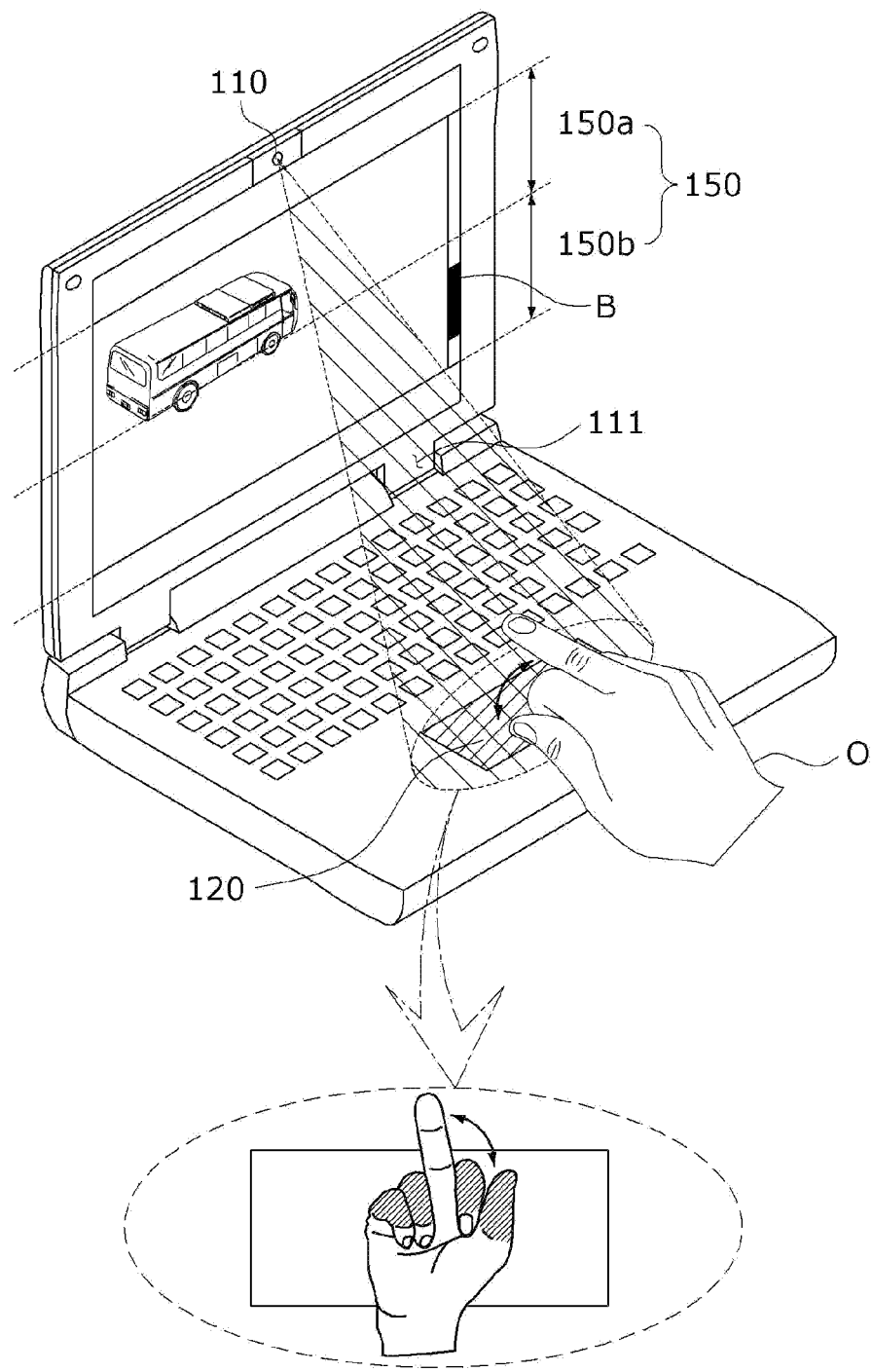

[FIG. 8]
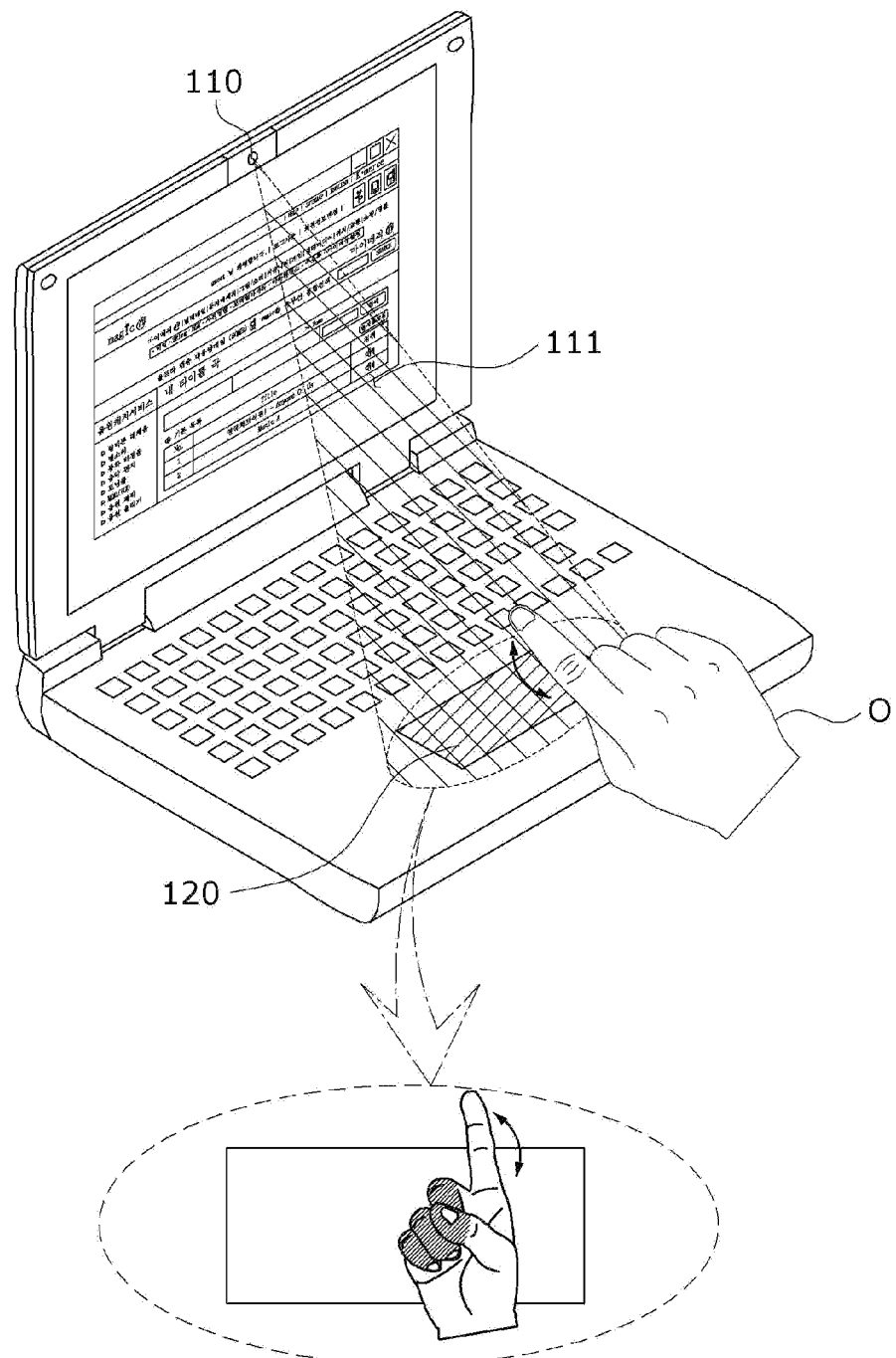

[FIG. 9]
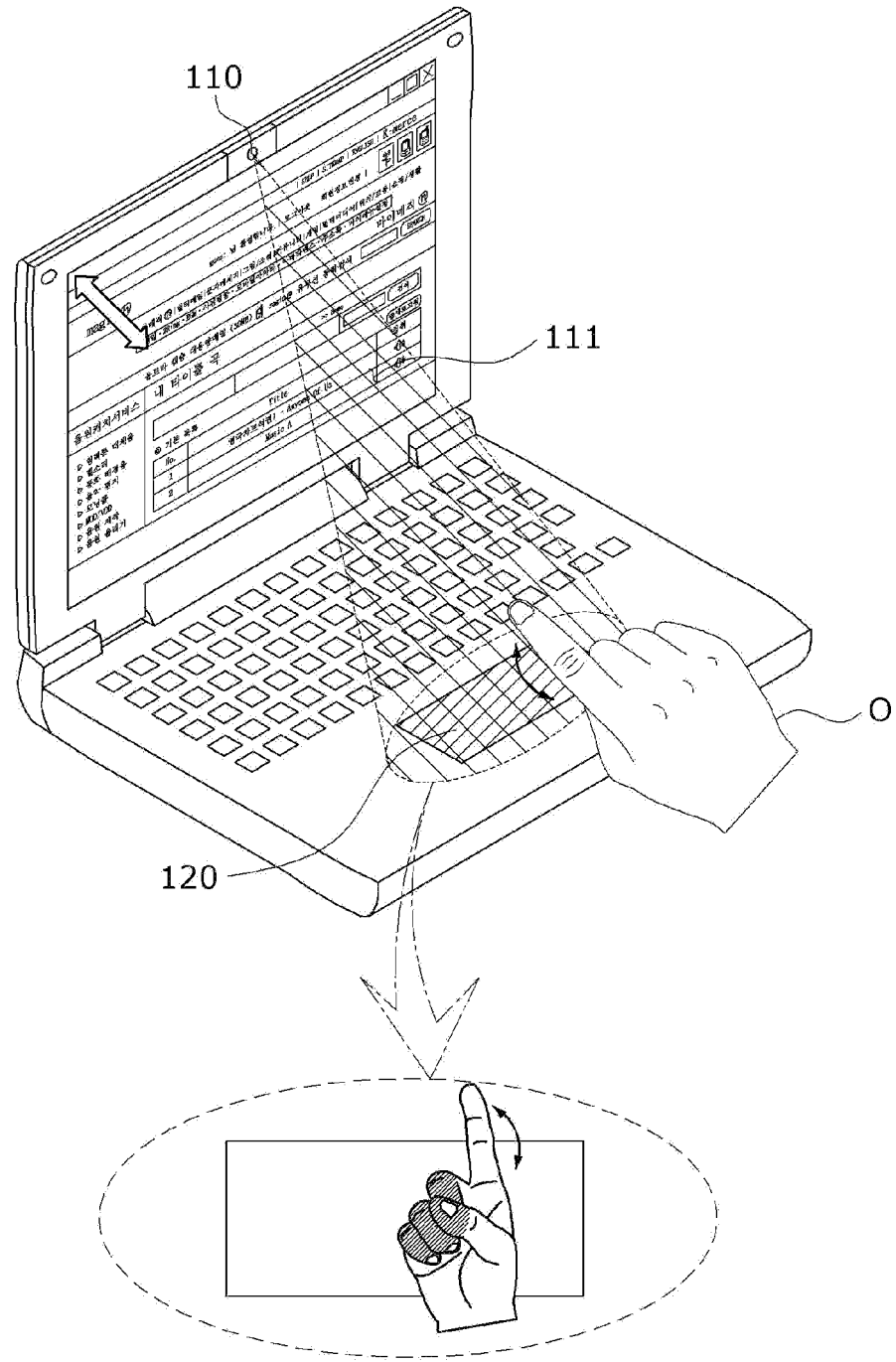

[FIG. 10]
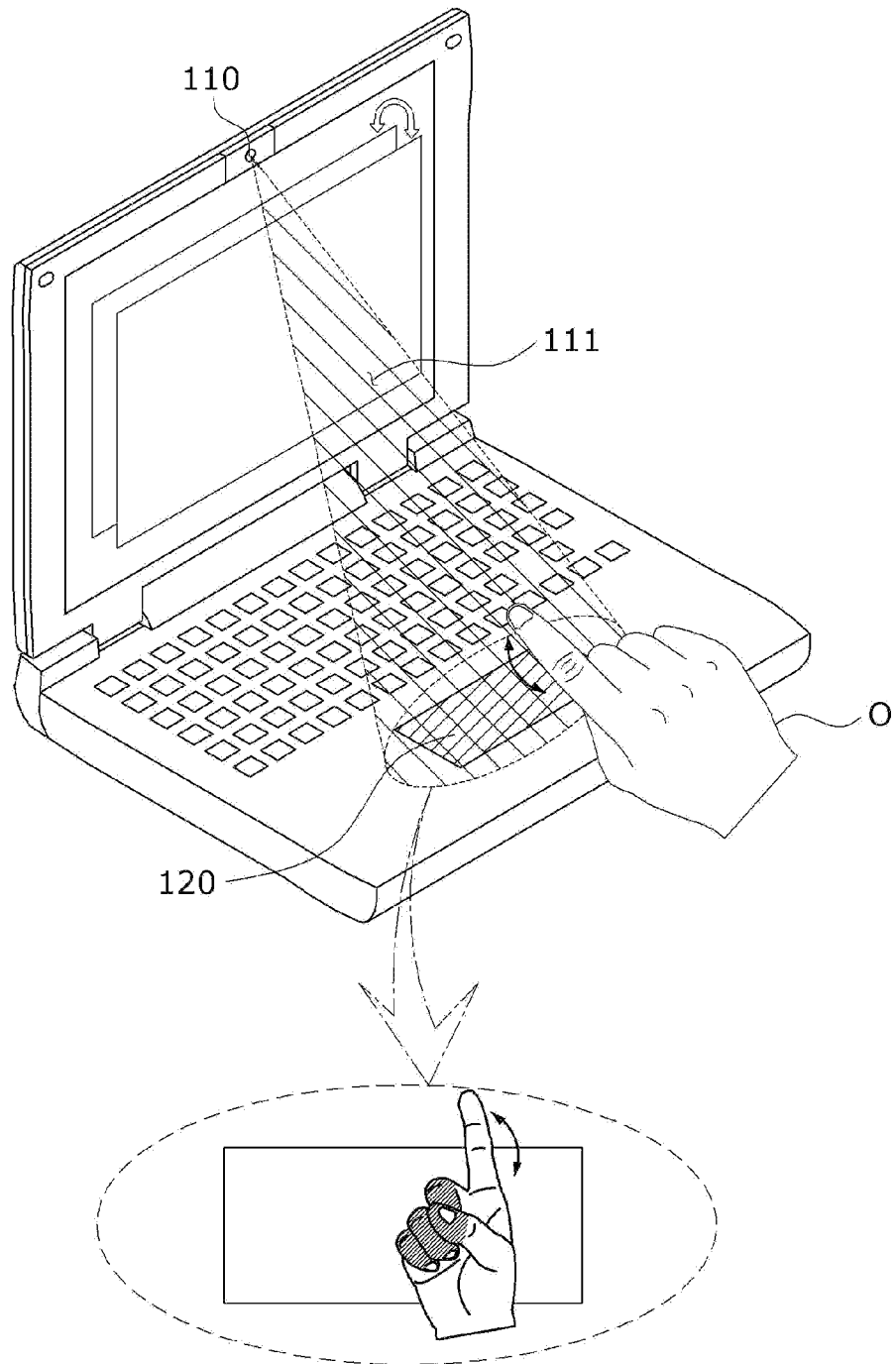

[FIG. 11]
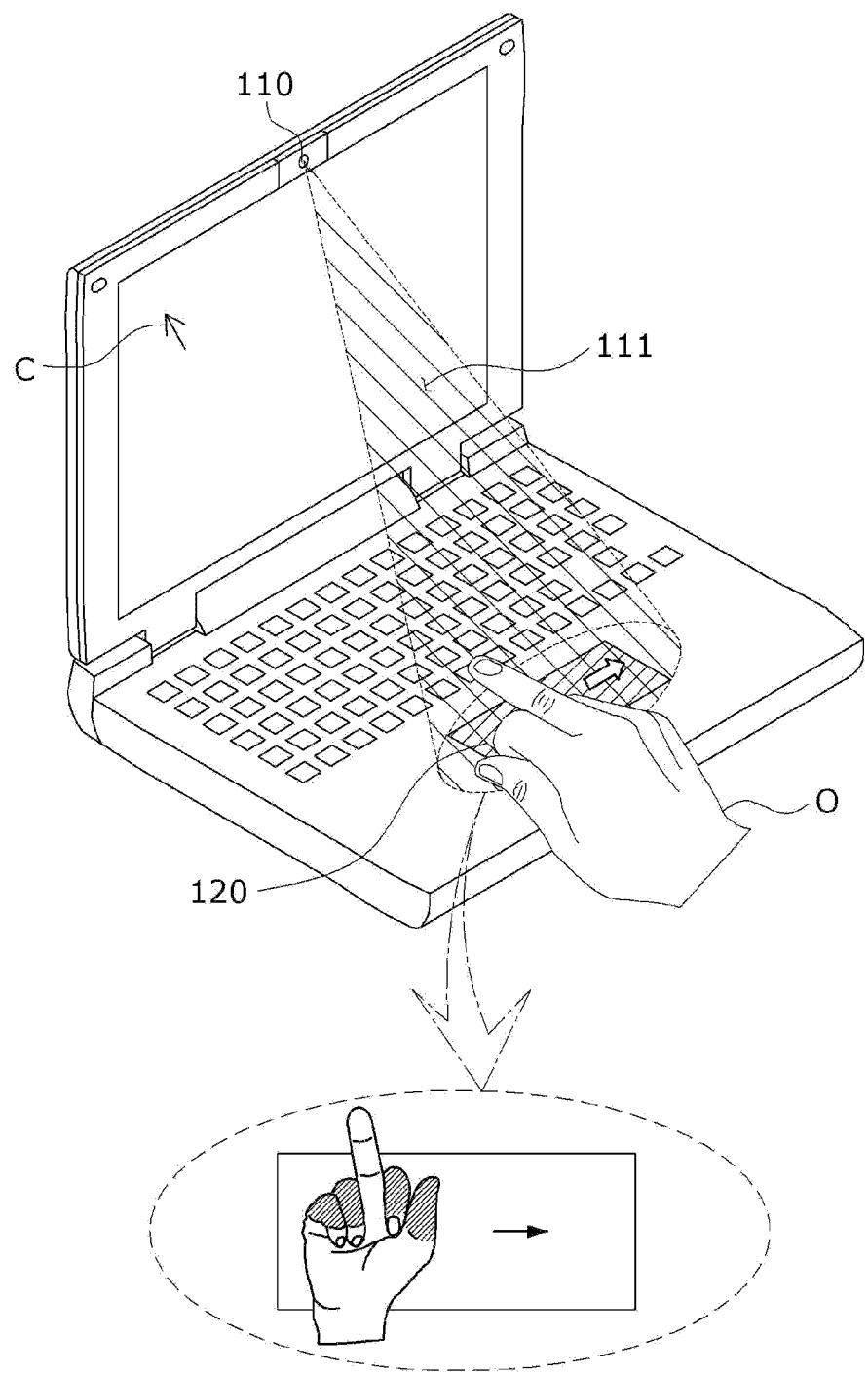

[FIG. 12]
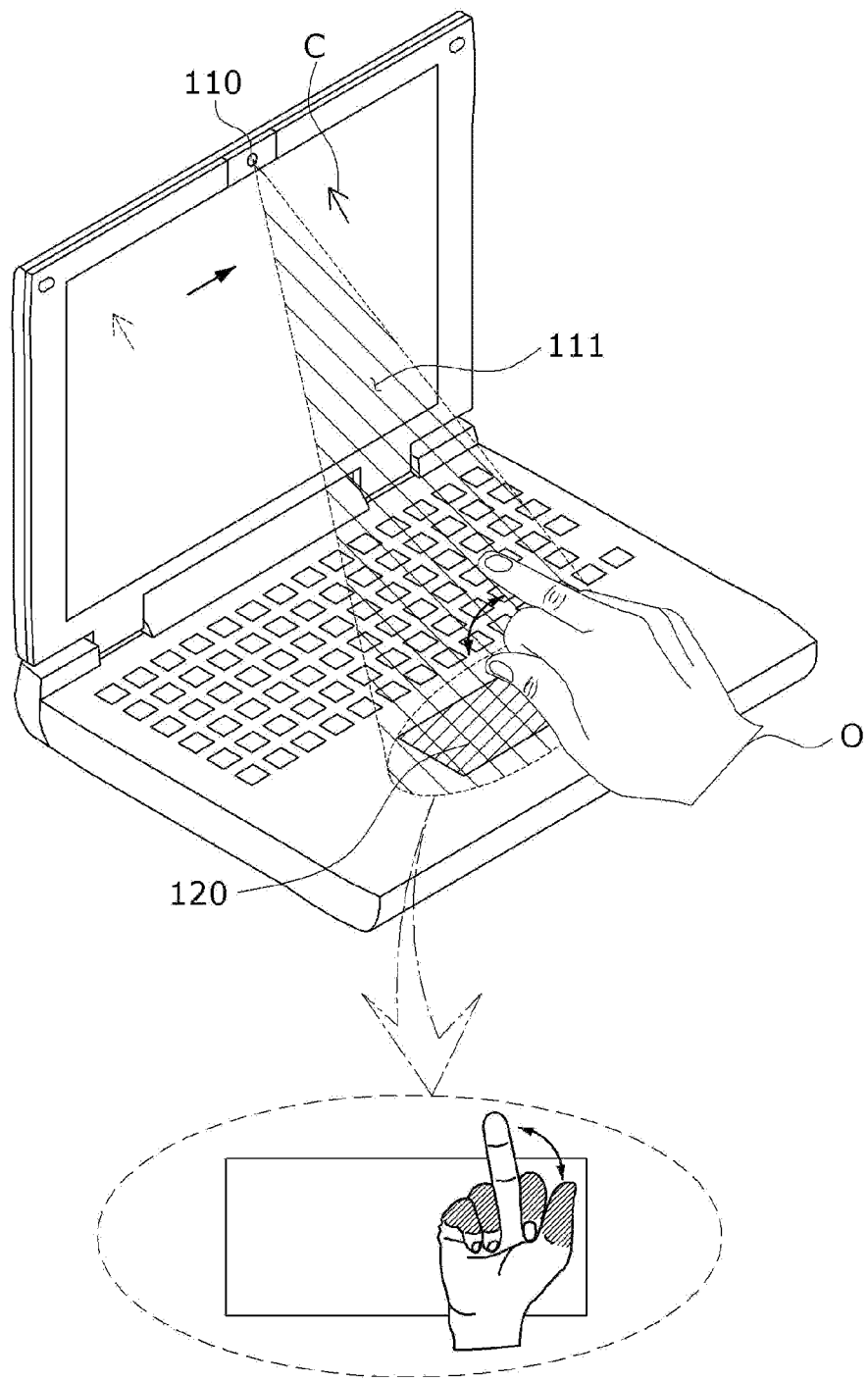

[FIG. 13]
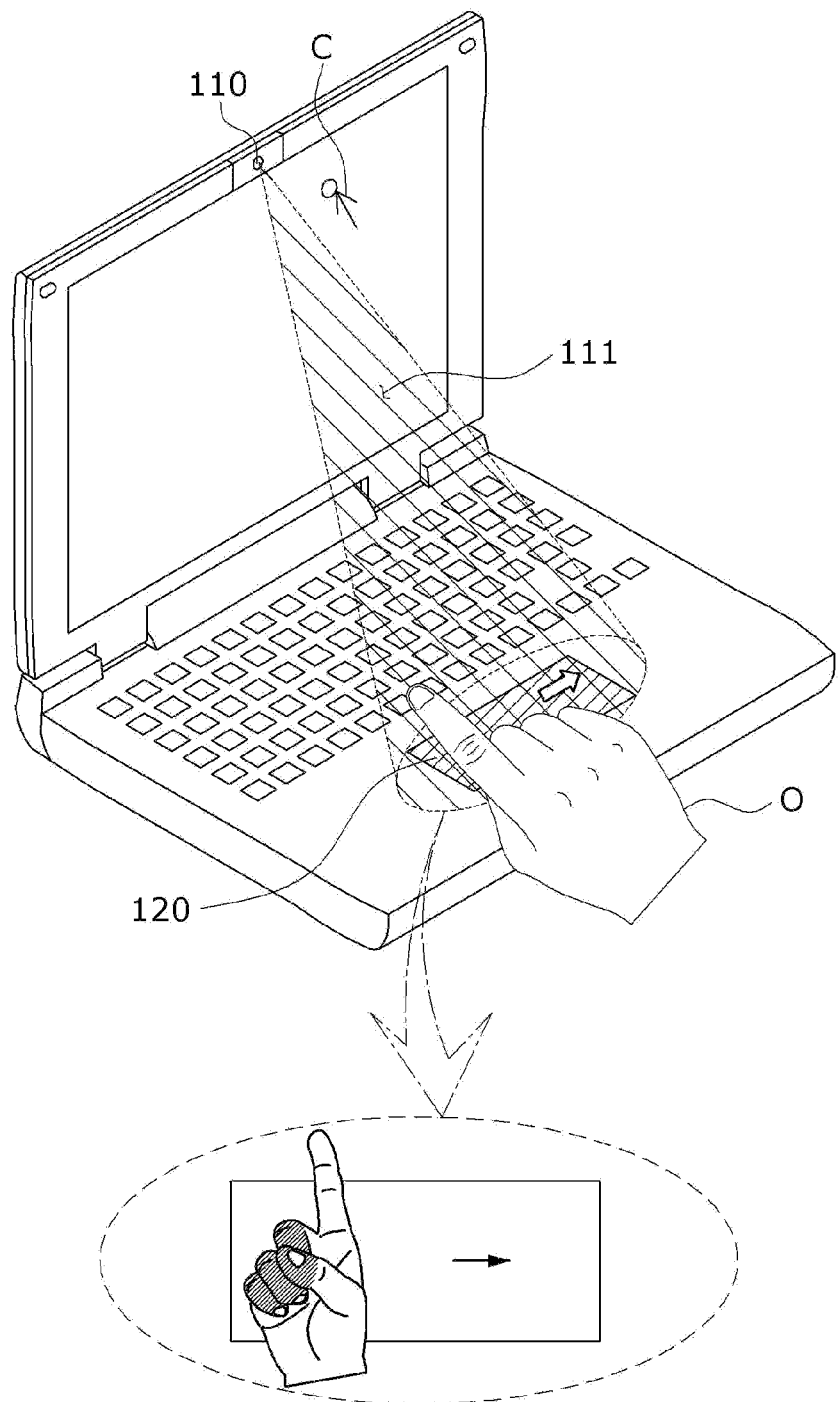

[FIG. 14]
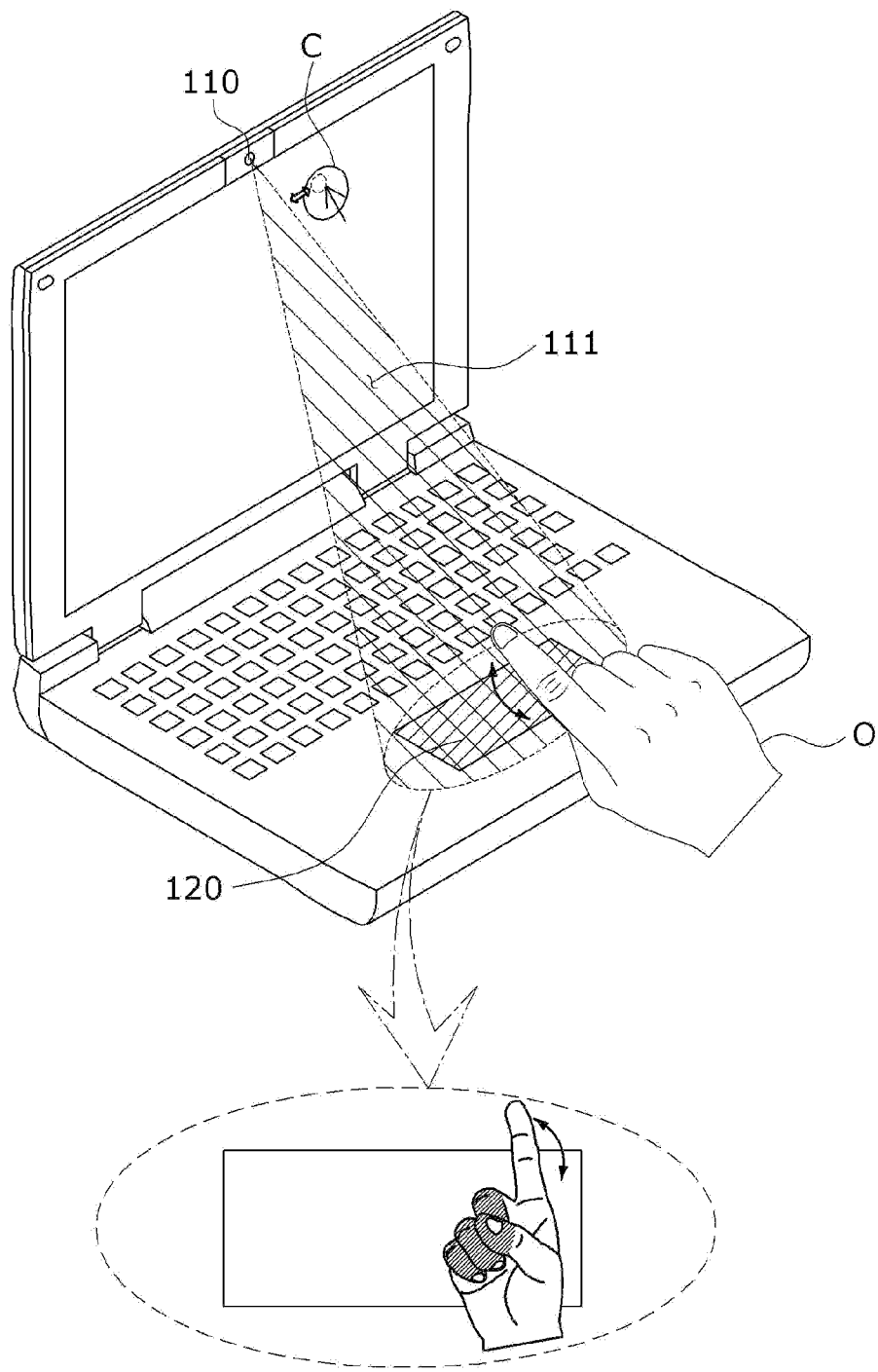

[FIG. 15]
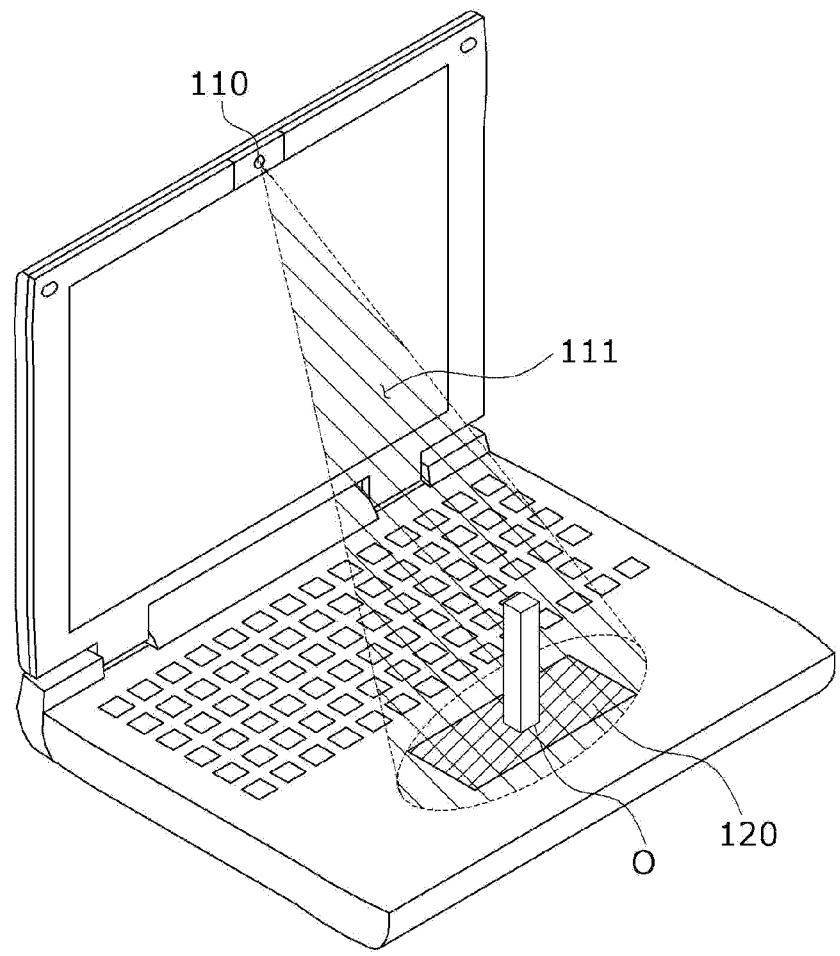

Jul. 5, 2019, all of which are hereby expressly incorporated by reference into the present application.

ELECTRONIC DEVICE

CROSS REFERENCE TO RELATED APPLICATIONS

This application is the National Phase of PCT International Application No. PCT/KR2020/008710, filed on Jul. 3, 2020, which claims priority under 35 U.S.C. 119(a) to Patent Application No. 10-2019-0081184, filed in the Republic of Korea on Jul. 5, 2019, all of which are hereby expressly incorporated by reference into the present application.

TECHNICAL FIELD

The present invention relates to an electronic device configured to output an instruction corresponding to a motion of a user or the like.

BACKGROUND ART

Generally, in addition to keyboards, auxiliary devices such as mouses or joysticks are used as devices through which instructions are selected and input. As an example, in the case of a mouse, a position of an instruction target is changed, or a specific instruction is input, which is a function of the mouse, by rolling a ball or using an optical sensor disposed at a lower end of the mouse.

When the mouse is used, since the mouse should be mainly placed and used on a desk or mouse pad and has a physical size and a shape, it is inconvenient to carry, and since a mat, such as a mouse pad, for recognizing movement of the mouse is needed under the mouse, it is inconvenient.

In addition, while the mouse is used, when a keyboard should be used in order to input a letter, since the mouse should be released to hit the keyboard, there are many unnecessary movements, and since the conventional mouse has a shape grasped by a hand, the movement should become unnecessarily large, and thus, it is very inconvenient to carry.

DISCLOSURE

Technical Problem

The present invention is directed to providing an electronic device controlled according to movement information of a detection target in various regions without using an input device such as a mouse.

In addition, the present invention is directed to providing an electronic device with improved convenience.

In addition, the present invention is directed to providing an electronic device with improved accuracy of instruction execution for an input.

Objectives that should be achieved by the embodiments are not limited thereto and include purposes or effects which may be extracted from solutions or the embodiments of the objectives which will be described below.

One aspect of the present invention provides an electronic device including a first acquisition unit which outputs first motion information about a detection target in a first detection region, a second acquisition unit which outputs second motion information about the detection target in a second detection region, and a control unit which executes an instruction according to the first motion information and the second motion information, wherein the first detection region and the second detection overlap at least partially.

The first detection region may be a region projected from the first acquisition unit toward the second acquisition unit.

The second detection region may be an upper region of the second acquisition unit.

The first acquisition unit may include an image capturing device, and the second acquisition unit may include a touch pad.

The second motion information may include a change value with respect to a lower region of the detection target, and the first motion information may include a change value with respect to a region excluding the lower region of the detection target.

The second motion information may be about a contact area between the detection target and the second acquisition unit, and the first motion information may include movement of the detection target and movement of a specific region.

When there is no movement of the detection target and there is movement of only the specific region in the first motion information, and when the contact area increases or decreases in the second motion information, the control unit may output an instruction for any one among scrolling, scaling, and window/viewport transformation.

When there are point movement of the detection target and point movement of the specific region in the first motion information, and when the contact area decreases in the second motion information, the control unit may output an instruction for cursor moving and click.

The first detection region may include a plurality of first axes, the second detection region may include a plurality of second axes, and the plurality of first axes and the plurality of second axes may be positioned not to be parallel to each other.

The electronic device may further include a display unit which displays an output according to the executed instruction, a storage unit which stores data about an instruction mapped to the first motion information and the second motion information, and a driving unit which moves at least one of the first acquisition unit and the second acquisition unit.

Advantageous Effects

According to embodiments, an electronic device controlled according to movement information of a detection target in various regions can be implemented without using an input device such as a mouse.

In addition, an electronic device with improved convenience can be implemented.

In addition, an electronic device with improved accuracy of instruction execution for an input can be implemented.

Various useful advantages and effects of the present invention are not limited to the above-described contents and will be more easily understood in the above-described detailed description of embodiments of the present invention.

DESCRIPTION OF DRAWINGS

FIG. 1 is a block diagram illustrating an electronic device according to an embodiment of the present invention.

FIG. 2 is a conceptual view illustrating an electronic device according to an embodiment of the present invention.

FIG. 3 is a view illustrating a first detection region and a second detection region of the electronic device according to the embodiment of the present invention.

FIG. 4 is a view illustrating a modified example of FIG. 3.

FIG. 5 is a view for describing an operation of the electronic device for a detection target according to the embodiment of the present invention.

FIGS. 6 and 7 are views for describing operations of a control unit according to a first embodiment of the present invention.

FIGS. 8 to 10 are views for describing operations of a control unit according to a second embodiment of the present invention.

FIGS. 11 and 12 are views for describing operations of a control unit according to a third embodiment of the present invention.

FIGS. 13 and 14 are views for describing operations of a control unit according to a fourth embodiment of the present invention.

FIG. 15 is a view for describing an operation of a control unit according to a fifth embodiment of the present invention.

MODES OF THE INVENTION

Hereinafter, exemplary embodiments of the present invention will be described in detail with reference to the accompanying drawings.

However, the technical spirit of the present invention is not limited to some embodiments which will be described and may be implemented in a variety of different forms, and at least one or more components of the embodiments may be selectively combined, substituted, and used within the range of the technical spirit.

In addition, unless clearly and specifically defined otherwise by the context, terms (including technical and scientific terms) used herein can be interpreted as having meanings customary to those skilled in the art, and meanings of generally used terms, such as those defined in commonly used dictionaries, will be interpreted in consideration of contextual meanings of the related technology.

In addition, the terms used in the embodiments of the present invention are considered in descriptive senses and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In descriptions of components of the present invention, terms such as "first," "second," "A," "B," "(a)," and "(b)" can be used.

The terms are only to distinguish one element from another element, and the essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element with still another element disposed therebetween.

In a case in which any one element is described as being formed or disposed "on or under" another element, such a description includes both a case in which the two elements are formed or disposed to be in direct contact with each other and a case in which one or more other elements are interposed between the two elements. In addition, when one element is described as being formed "on or under" another element, such a description may include a case in which the one element is formed at an upper side or a lower side with respect to another element.

FIG. 1 is a block diagram illustrating an electronic device according to an embodiment of the present invention, and FIG. 2 is a conceptual view illustrating the electronic device according to the embodiment of the present invention.

Referring to FIGS. 1 and 2, an electronic device 10 according to the embodiment of the present invention may include a first acquisition unit 110, a second acquisition unit 120, a control unit 130, a storage unit 140, a display unit 150, and a driving unit 160.

The first acquisition unit 110 may output first motion information about a detection target in a first detection region. As an example, the first acquisition unit 110 may include an image capturing device. For example, the first acquisition unit 110 may include one of various image capturing devices such as a red-green-blue (RGB) camera and a three-dimensional (3D) camera. In addition, a detection target O may include a physical object and a virtual object. In addition, the physical object may be an object, such as a hand, a foot, and a face of a human, and an object which physically exists in the real world.

In addition, the first acquisition unit 110 may output the first motion information of the detection target O moving in the first detection region which is a region projected by the image capturing device.

As an example, the first acquisition unit 110 may acquire an image acquired through the image capturing device. In addition, the first acquisition unit 110 may output movement information of the detection target O from the acquired image. However, in the present specification, the first acquisition unit 110 is described as outputting the movement information from the acquired image, but it should be understood to include a case in which the first acquisition unit 110 includes only the image capturing device, and the control unit 130 or another processing unit (for example, a processor) in the electronic device 10 outputs the movement information from the acquired image.

The first motion information of the detection target O may include movement or a change in shape of an entirety or part of the detection target O. As an example, the first motion information may include movement values of points of the detection target O in the acquired image. For example, when the detection target O is a human hand, the first motion information may include information of movement values of points corresponding to joints of the hand or a finger. Accordingly, the first acquisition unit 110 may transmit the first motion information to the control unit 130 in the electronic device 10.

In addition, the first acquisition unit 110 may be provided as a plurality of first acquisition units 110. As an example, the first acquisition unit 110 may be positioned at an edge of the electronic device 10 or in a hinge region, but the present invention is not limited to the position.

The second acquisition unit 120 may output second motion information about the detection target O in a second detection region. The second acquisition unit 120 may be disposed to be spaced apart from the first acquisition unit 110.

In addition, the second acquisition unit 120 may include a pad, pen, and the like. Hereinafter, the second acquisition unit 120 will be described as a pad (for example, a touch pad). In addition, the second acquisition unit 120 may be positioned inside or outside the electronic device 10 according to the embodiment of the present invention.

In addition, the second acquisition unit 120 may transmit the output second motion information to the control unit 130 in the electronic device 10.

In addition, the second detection region in the second acquisition unit 120 may be an upper region of the second acquisition unit 120. As an example, when the second acquisition unit 120 is the pad, the second detection region may be an upper surface of the pad.

The second acquisition unit 120 may output the second motion information including movement information of the detection target O. The second motion information may include a change value with respect to a lower region of the detection target O. As an example, the second motion information may include a contact area at which the lower region of the detection target O is in contact with the upper surface of the pad. For example, the second motion information may include a change in the contact area or an extent of the area.

On the other hand, the first motion information may include change values with respect to a region excluding the lower region of the detection target. That is, the first motion information may include movement and the like of points of the detection target O in the region (for example, a side region or an upper region) other than the lower region of the detection target O.

In addition, the second detection region may partially overlap the first detection region. As an example, each of the first detection region and the second detection region may be a space. In addition, the first detection region may be the space having a plurality of first axes. Similarly, the second detection region may be the space having a plurality of second axes. As an example, the plurality of first axes may include a first-1 axis, a first-2 axis, and a first-3 axis in the case of the space. In this case, the first-1 axis may be a first-1 axis connecting a center of the first acquisition unit and a center of the second acquisition unit. For example, the center of the first acquisition unit may be a center of a surface of an image capturing unit (for example, a lens) in the image capturing device in the electronic device, and the center of the second acquisition unit may be a center of the touch pad.

The first-2 axis and the first-3 axis may be positioned perpendicular to the first-1 axis, and the first-2 axis and the first-3 axis may be positioned perpendicular to each other.

In addition, the plurality of second axes may include a second-1 axis, a second-2 axis, and a second-3 axis in the case of the space. In this case, the second-1 axis, the second-2 axis, and the second-3 axis may be positioned perpendicular to each other. In addition, any one of the second-1 axis, the second-2 axis, and the second-3 axis may be parallel to a direction toward an upper surface of the second acquisition unit. However, the present invention is not limited thereto.

In addition, the plurality of first axes and the plurality of second axes may not be parallel to each other. That is, at least one of the plurality of first axes may be disposed to intersect the plurality of second axes. Through this configuration, the electronic device according to the embodiment of the present invention may execute an instruction using motion information for the different regions of the detection target O acquired from the first acquisition unit 110 and the second acquisition unit 120. In other words, the electronic device may provide more accurate and varied instructions related to the same motion by detecting the movement in the different regions.

The control unit 130 may receive the first motion information and the second motion information from the first acquisition unit 110 and the second acquisition unit 120. In addition, the control unit 130 may execute an instruction which uses and corresponds to the first motion information and the second motion information.

The first motion information and the second motion information may be mapped to predetermined an instruction. In addition, mapped data may be stored in the storage unit 140. That is, when the control unit 130 receives the first motion information and the second motion information, the control unit 130 may output the instruction mapped through the storage unit 140. Such an output may be the same as an input from various input interfaces (mouse, keyboard, camera, and the like), or a different function may be variously performed at the same time. That is, the electronic device 10 according to the embodiment of the present invention may execute various inputs using the first motion information and the second motion information.

In addition, the control unit 130 may be positioned in or connected to a main processor in the electronic device 10 and transmit/receive an electric signal. The main processor may control overall operations of the electronic device 10. For example, the main processor may be positioned in a predetermined housing and electrically connected to the first acquisition unit, the second acquisition unit (touch pad), the storage unit 140, the display unit 150, the driving unit 160, and the like to control components of the electronic device 10. The main processor may receive an instruction from the storage unit 140 and control the components according to the received instruction to perform various functions. The main processor may include a central processing unit (CPU), an application processor (AP), a micro control unit (MCU), a micro processor unit (MCU), and the like. The main processor may include a single core processor or multi-core processor.

In addition, the control unit 130 may include a software or hardware component such as a field-programmable gate array (FPGA) or application specific integrated circuit (ASIC) but is not limited thereto.

In the storage unit 140, the first motion information, the second motion information, and a corresponding instruction mapped thereto may be stored as described above.

In addition, mapped data in the storage unit 140 may be variously changed by a user. For example, when the user performs a hand motion and the electronic device 10 according to the embodiment of the present invention receives the first motion information and the second motion information about the hand motion, reset, deletion, modification, or the like may be performed for an instruction.

In addition, the storage unit 140 may be positioned in the housing and electrically connected to the main processor. The storage unit 140 may store various programs for operating the electronic device 10, data generated when the various programs are executed, downloaded data, or the like. In addition, the storage unit 140 may store various commands and/or instructions for operating the main processor. The storage unit 140 may include at least any one of an internal memory or external memory.

The display unit 150 may display an execution result of an instruction output from the control unit 130. In addition, the display unit 150 may include at least one of a liquid crystal display, a thin film transistor-liquid crystal display, an organic light-emitting diode, a flexible display, a 3D display, and an electrophoretic display. However, the display unit 150 may not be limited thereto and may include a device that displays a processing result according to an instruction and the like to the user.

The driving unit 160 may be connected to at least one of the first acquisition unit 110 and the second acquisition unit 120. In addition, the driving unit 160 may move the first detection region or the second detection region. As an example, the driving unit 160 may be connected to the first acquisition unit 110 and may change an image capturing angle of the first acquisition unit 110. Accordingly, the first detection region, which is a region projected by the first acquisition unit 110, may be changed by the driving unit 160. Through this configuration, motion information may be acquired at various positions close to the electronic device 10.

In addition, the electronic device 10 according to the embodiment may be a smart phone, a wearable device, a tablet personal computer (PC), a general PC, a notebook, or the like supporting a desktop extension mode but is not limited thereto.

FIG. 3 is a view illustrating the first detection region and the second detection region of the electronic device according to the embodiment of the present invention.

Referring to FIG. 3, the first detection region may be a region projected by the first acquisition unit 110 toward the second acquisition unit 120. In addition, the second detection region may be an upper region of the second acquisition unit 120. In addition, hereinafter, the first acquisition unit 110 will be described as the image capturing device, and the second acquisition unit 120 will be described as the pad.

In addition, the first detection region may be a space of a region greater than an upper surface of the second acquisition unit 120. Accordingly, the second detection region may overlap the first detection region.

In addition, the plurality of first axes may include a first-1 axis X1, a first-2 axis X2, and a first-3 axis X3. In this case, the first-1 axis X1 may be an axis connecting the center of the first acquisition unit and the center of the second acquisition unit. In addition, a center C1 of the first acquisition unit 110 may be the center of the surface of the image capturing unit (for example, the lens) of the image capturing device in the electronic device, and a center C2 of the second acquisition unit 120 may be the center of the touch pad.

In addition, as described above, the plurality of first axes X1, X2, and X3 and the plurality of second axes Y1, Y2, and Y3 may not be parallel to each other. Through this configuration, as will be described below, the first acquisition unit 110 and the second acquisition unit 120 output the first motion information and the second motion information of the detection target O in regions which do not overlap so that an instruction corresponding to movement of the detection target O is accurately executed in the electronic device.

In addition, as described above, the plurality of second axes may include a second-1 axis Y1, a second-2 axis Y2, and a second-3 axis Y3 in the case of the space. In this case, the second-1 axis Y1, the second-2 axis Y2, and the second-3 axis Y3 may be positioned perpendicular to each other. In addition, any one of the second-1 axis Y1, the second-2 axis Y2, and the second-3 axis Y3 may be parallel to a direction toward the upper surface of the second acquisition unit. In this case, the second-3 axis Y3 may be parallel to the direction toward the upper surface of the second acquisition unit.

Referring to FIG. 4, similarly, a first detection region and a second detection region may partially overlap. In addition, the second detection region may be a region extending upward from a second acquisition unit 120. In other words, a second detection region 121 may include a region in which the second detection region 121 of FIG. 3 extends upward.

In addition, the first detection region and the second detection region may include an overlapping region OR. The overlapping region OR may be positioned on the second acquisition unit 120.

In addition, according to the embodiment, when a detection target is positioned in the overlapping region OR, first motion information and second motion information may be output from a first acquisition unit 110 and a second acquisition unit 120. Hereinafter, the embodiment will be described based on FIG. 3.

FIG. 5 is a view for describing an operation of the electronic device for the detection target according to the embodiment of the present invention.

Referring to FIG. 5, the detection target O may move in a first detection region 111 and a second detection region 121. In this case, the first acquisition unit 110 may output information about movement of the detection target O in the first detection region 111 which is a projected region. In addition, the second acquisition unit 120 may output information about the movement of the detection target O in the second detection region 121 which is an upper region thereof. In addition, as described above, the control unit may receive first motion information and second motion information from the first acquisition unit 110 and the second acquisition unit 120 and change an instruction output according to the movement of the detection target O. Through this configuration, the electronic device according to the embodiment of the present invention may provide the user with an environment in which an instruction, such as an input, is easily executed through various manners or motions. In other words, the electronic device according to the embodiment of the present invention may provide an input interface environment which is easily accessible.

FIGS. 6 and 7 are views for describing operations of a control unit according to a first embodiment of the present invention.

Referring to FIGS. 6 and 7, first motion information may be a change value with respect to a region excluding a lower region of a detection target. Second motion information may be a change value of a contact area in which a lower region of a detection target O is in contact with a pad 120. Hereinafter, the detection target O will be limited to and described as a hand Specifically, according to the first embodiment, when there is no movement of the hand and there is movement of only a specific region (for example, a specific finger) of the hand in the first motion information, and when the contact area decreases in the second motion information, a control unit may output any one among scrolling, scaling, and window/viewport transformation.

As described above, the first motion information may have movement values of points of the detection target. However, FIGS. 6 and 7 show a case in which an entirety of a hand O does not move in a certain direction. In this case, in the first motion information, the movement value of the detection target may be, for example, zero. In addition, when the control unit receives the above-described first motion information, the control unit may determine that all of the points of the detection target do not move in the certain direction.

However, in addition, the first motion information may have movement values of a partial region (for example, a middle finger) of the hand O. Accordingly, the first motion information may have movement values of some of the points of the detection target.

In addition, the second motion information may have a change value for a decrease in the contact area between the hand O and a second acquisition unit 120.

In addition, when there is no movement of the detection target and there is movement of only a specific region (for example, the middle finger) in the first motion information, and when a contact area decreases in the second motion information, the control unit may output an instruction for scrolling. In this case, the control unit may determine the movement of the specific region in the first motion information through positions of a plurality of points disposed on the detection target to detect the movement of the detection target.

Accordingly, as an example, when the control unit detects movement of the middle finger while the hand does not move, the control unit may output an instruction for scrolling. Then, an electronic device may operate according to the instruction. For example, a display unit 150 may be divided into an upper region 150a and a lower region 150b. In addition, while a bar B is positioned in the upper region, when the hand does not move and the middle finger moves upward, the bar may be moved downward. However, such a movement direction of the bar B may be variously changed according to setting.

In addition, when there is an increase or decrease in the contact area in the second motion information, the control unit may recheck movement of the specific region by calculating a position at which a largest change in area occurs. Through this configuration, the electronic device according to the embodiment of the present invention may perform an accurate input interface function to correspond to even a motion of the user without an error.

FIGS. 8 to 10 are views for describing operations of a control unit according to a second embodiment of the present invention.

Referring to FIGS. 8 to 10, a control unit according to the second embodiment of the present invention may output any one of scaling and window/viewport transformation when detecting movement of a finger (a region other than a specific region), that is, not the middle finger of FIG. 6 described above, other than a middle finger.

Specifically, as described above, first motion information may be a change value with respect to a region other than a lower region of a detection target. In addition, second motion information may be a change value of a contact area between a lower region of a detection target O and a pad 120.

In addition, when there is no movement of a hand and there is movement of only a region (for example, a thumb, an index finger, a ring finger, or a little finger) other than the specific region in the first motion information, and when the contact area increases or decreases in the second motion information, the control unit may output any one of scaling and window/viewport transformation.

In addition, FIG. 8 shows a case in which an entirety of a hand O does not move in a certain direction similarly to FIG. 7. Accordingly, in the first motion information, a movement value of the detection target may be zero. In addition, when the control unit receives the above-described first motion information, the control unit may determine that all points of the detection target are not moved in the certain direction.

In addition, in the first motion information, a partial region (for example, the index finger) of the hand O may have movement values. Accordingly, there are movement values of some points of the detection target.

In addition, since the second motion information has a change value for a decrease in the contact area between the hand O and a second acquisition unit 120, there is no movement of the detection target and there is movement of only a region (for example, the index finger) other than the specific region in the first motion information, the contact area increases or decreases in the second motion information, and thus the control unit may output one of scaling and window/viewport transformation.

For example, when a plurality of windows are displayed on a display unit, the control unit outputs an instruction for window/viewport transformation as shown in FIG. 10, and when one window is displayed on the display unit, the control unit may output an instruction for scaling of the window as shown in FIG. 9.

Similarly, the control unit may determine the movement of the specific region in the first motion information through positions of a plurality of points disposed at the detection target to detect movement of the detection target. Accordingly, when the control unit detects the movement of the index finger while the hand does not move, the control unit may output an instruction for any one of scaling and window/viewport transformation. In addition, an electronic device may operate according to such an instruction. Through this configuration, the electronic device according to the embodiment of the present invention may provide a user with an environment in which not only a simple operational function (for example, click and cursor moving) of a pad while manipulating the pad but also a convenient input interface function through movement of the hand are performed.

In addition, similarly, when there is the increase or decrease in the contact area in the second motion information, the control unit may recheck the movement of the above-described specific region by calculating a position at which a largest change in area occurs. That is, the control unit may determine whether it is a case in which a change in the contact area occurs at the middle finger which is the specific region, a case in which a change in the contact area occurs at the index finger other than the specific region, or the like. Through this configuration, the electronic device according to the embodiment of the present invention may perform an accurate input interface function to correspond to even a motion of the user without an error.

FIGS. 11 and 12 are views for describing operations of a control unit according to a third embodiment of the present invention.

Referring to FIGS. 11 and 12, a control unit according to the third embodiment of the present invention may output an instruction for cursor moving and click when there are point movement of a detection target and point movement of a specific region (for example, a middle finger) in a first motion information and when there is a decrease in a contact area in the second motion information.

Specifically, as described above, the first motion information may be a change value with respect to a region other than a lower region of the detection target. In addition, the second motion information may be a change value of the contact area between a lower region of a detection target O and a pad 120.

In addition, when there are movement of a hand and movement of the specific region (for example, the middle finger) of the hand at the same time in the first motion information, and when the contact area increases or decreases in the second motion information, the control unit my output an instruction for cursor moving and click.

In addition, FIG. 11 shows a case in which an entirety of a hand O moves in a certain direction unlike FIG. 7. Accordingly, in the first motion information, a movement value of the detection target may not be zero. In addition, when the control unit receives the above-described first motion information, the control unit may determine that all points of the detection target move in the certain direction. In this case, the certain direction may correspond to a movement direction of an above-described cursor C.

In addition, in the first motion information, a partial region (for example, the middle finger) of the hand O may have a movement value. That is, there may be movement values of some points of the detection target.

In addition, since the second motion information has a change value for a decrease in the contact area between the hand O and a second acquisition unit 120, there are movement of the detection target and movement of the specific region (for example, the middle finger) in the first motion information, the contact area increases or decreases in the second motion information, and thus the control may output an instruction for cursor moving and click as described above.

For example, a cursor displayed on a display unit moves in a direction which is the same as a movement direction of a finger as in FIGS. 11 and 12, and clicking may be executed at the same time.

In addition, the control unit may determine the movement of the specific region through positions of a plurality of points disposed at the detection target in the first motion information. Accordingly, when the control unit detects movement of a hand and movement of the middle finger at the same time, the control unit may output an instruction for cursor moving and click. Then, an electronic device may operate according to the instruction.

Through the above-described configuration, the electronic device according to the embodiment of the present invention may provide a user with an environment in which not only a simple operational function (for example, click and cursor moving) of a pad while manipulating the pad but also a convenient input interface function through movement of the hand are performed.

In addition, the content, in which the control unit may recheck the movement of the above-described specific region by calculating a position at which a largest change in area occurs when there is an increase or decrease in the contact area in the second motion information, may be the same as the previous content. Through this configuration, the electronic device according to the embodiment of the present invention may perform an accurate input interface function to even correspond to a motion of the user without an error.

FIGS. 13 and 14 are views for describing operations of a control unit according to a fourth embodiment of the present invention.

Referring to FIGS. 13 and 14, a control unit according to the fourth embodiment of the present invention may output an instruction for cursor moving and click when there are point movement of a detection target and point movement of a region (for example, a thumb, an index finger, a ring finger, or a little finger) other than a specific region in a first motion information, and when a contact area decreases in second motion information.

Specifically, the first motion information may be a change value with respect to a region other than a lower region of the detection target. In addition, the second motion information may be a change value of the contact area between a lower region of a detection target O and a pad 120.

When there is no movement of a hand and there is movement of only a region (for example, the thumb, the index finger, the ring finger, or the little finger, hereinafter, described as the index finger) other than a specific region in the first motion information, and when the contact area increases or decreases in the second motion information, the control unit may output an instruction for any one of scaling and window/viewport transformation.

In addition, FIG. 14 shows a case in which an entirety of a hand O moves in a certain direction. Accordingly, in the first motion information, a movement value of the detection target may not be zero. In addition, when the control unit receives the above-described first motion information, the control unit may determine that all points of the detection target move in the certain direction. In this case, the certain direction may correspond to a movement direction of the above-described cursor C.

In addition, in the first motion information, a partial region (for example, the index finger) of the hand O may have a movement value. That is, there may be movement values of some points of the detection target.

In addition, since the second motion information has the change value for a decrease in the contact area between the hand O and a second acquisition unit 120, there are movement of the detection target and movement of the specific region (for example, the index finger) in the first motion information, and the contact area increases or decreases in the second motion information, and thus the control unit may output an instruction for a change in magnitude of click of a cursor as described above.

For example, the cursor displayed on a display moves in a direction which is the same as a movement direction of the finger, and a change in the magnitude of the click may be executed at the same time.

In addition, the control unit may determine the movement of the specific region through positions of a plurality of points disposed at the detection target in the first motion information. Accordingly, when the control unit detects movement of a hand and movement of the index finger at the same time, the control unit may output an instruction for cursor moving and click at the same time. Then, an electronic device may operate according to the instruction.

Through the above-described configuration, the electronic device according to the embodiment of the present invention may provide a user with an environment in which not only a simple operational function (for example, click and cursor moving) of a pad is performed while manipulating the pad but also a convenient input interface function is performed through movement of the hand.

In addition, similarly, when there is the increase or decrease in the contact area in the second motion information, the control unit may recheck the movement of the above-described specific region by calculating a position at which a largest change in area occurs. That is, the control unit may determine whether there is a case in which a change in the contact area occurs at the middle finger which is the specific region, a case in which a change in the contact area occurs at the index finger other than the specific region, or the like. Through this configuration, the electronic device according to the embodiment of the present invention may perform an accurate input interface function to even correspond to a motion of the user without an error.

FIG. 15 is a view for describing an operation of a control unit according to a fifth embodiment of the present invention.

Referring to FIG. 15, a control unit according to the fifth embodiment of the present invention may output a shape of a detection target O positioned on a second acquisition unit to a display unit 150 when there is a specific input. Accordingly, an area and a length of the detection target O positioned on a second acquisition unit 120 may be displayed accurately.

The terms, such as "~unit," used in the present embodiment refer to software or a hardware component such as an FPGA or an ASIC, and the term "~unit" plays certain roles. However, the term "~unit" is not limited to software or hardware. The term "~unit" may be formed to be included in an addressing storage medium or to reproduce one or more processors. Thus, in an example, the term "~unit" includes components, such as software components, object-oriented software components, class components, task components, processes, functions, properties, procedures, subroutines, segments of a program code, drivers, firmware, micro-codes, circuits, data, a database, data structures, tables, arrays, and variables. Functions provided by these components and the term "~unit" may be combined with a smaller number of components and "~units" or may be subdivided into additional components and "~units." Furthermore, the components and "~units" may also be implemented to reproduce one or more CPUs within a device or a security multimedia card.

The invention claimed is:

1. An electronic device comprising:
a first acquisition sensor configured to output first motion information about a detection target in a first detection region;
a second acquisition sensor configured to output second motion information about the detection target in a second detection region; and
a processor configured to:
in response to detecting a first portion of the detection target being lifted off of an upper surface of the second acquisition sensor based on the first motion information while detecting a second portion of the detection target remaining in contact with the upper surface of the second acquisition sensor based on the second motion information, execute a predetermined instruction according to the first motion information and the second motion information,
wherein the first detection region and the second detection region overlap at least partially,
wherein the first motion information is a change value with respect to a region excluding a lower region of the detection target,
wherein the second motion information is a change value of a contact area in which the lower region of the detection target is in contact with a pad,
wherein the first motion information has movement values of a partial region of the detection target,
wherein the second motion information has a change value for a decrease in the contact area between the detection target and the second acquisition sensor, and
wherein the processor rechecks a movement of a specific region by calculating a position at which a largest change in area occurs, when there is an increase or decrease in the contact area in the second motion information.

2. The electronic device of claim 1, wherein the first detection region is a region projected from the first acquisition sensor toward the second acquisition sensor.

3. The electronic device of claim 1, wherein the second detection region is an upper region of the second acquisition sensor.

4. The electronic device of claim 1, wherein:
the first acquisition sensor includes an image capturing device; and
the second acquisition sensor includes a touch pad.

5. The electronic device of claim 4, wherein, when there is no movement of the detection target and there is movement of only the specific region in the first motion information and when the contact area increases or decreases in the second motion information, the processor outputs an instruction for any one among scrolling, scaling, and window/viewport transformation.

6. The electronic device of claim 4, wherein, when there are point movement of the detection target and point movement of the specific region in the first motion information and when the contact area decreases in the second motion information, the processor outputs an instruction for cursor moving and click.

7. The electronic device of claim 1, wherein:
the first detection region includes a plurality of first axes;
the second detection region includes a plurality of second axes; and
the plurality of first axes and the plurality of second axes are positioned not to be parallel to each other.

8. The electronic device of claim 1, further comprising:
a display configured to display an output according to the predetermined instruction; and
a memory configured to store data about the predetermined instruction mapped to the first motion information and the second motion information,
wherein the processor is configured to move at least one of the first acquisition sensor and the second acquisition sensor.

9. The electronic device of claim 1, wherein the first acquisition sensor and the second acquisition sensor output the first motion information and the second motion information of the detection target in regions which do not overlap.

10. The electronic device of claim 1, wherein the detection target is a hand.

11. The electronic device of claim 10, wherein the processor outputs any one among scrolling, scaling, and window/viewport transformation, when there is no movement of the hand and there is movement of only a specific region of the hand in the first motion information and a contact area decreases in the second motion information.

12. The electronic device of claim 1, wherein the processor outputs an instruction for scrolling, when there is no movement of the detection target and there is movement of only a specific region in the first motion information, and when a contact area decreases in the second motion information.

13. The electronic device of claim 1, wherein the processor determines a movement of the specific region in the first motion information through positions of a plurality of points disposed on the detection target to detect the movement of the detection target.

* * * * *